US012333930B2

(12) United States Patent
Akita et al.

(10) Patent No.: US 12,333,930 B2
(45) Date of Patent: Jun. 17, 2025

(54) ELECTRONIC APPARATUS, CONTROL TARGET APPARATUS, ELECTRONIC SYSTEM, METHOD, AND COMPUTER PROGRAM

(71) Applicant: KABUSHIKI KAISHA TOSHIBA, Tokyo (JP)

(72) Inventors: Koji Akita, Yokohama Kanagawa (JP); Tomoya Tandai, Ota Tokyo (JP); Miyuki Ogura, Tachikawa Tokyo (JP); Ryoko Matsuo, Shinagawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1140 days.

(21) Appl. No.: 17/193,984

(22) Filed: Mar. 5, 2021

(65) Prior Publication Data

US 2022/0076557 A1 Mar. 10, 2022

(30) Foreign Application Priority Data

Sep. 7, 2020 (JP) ................................ 2020-149818

(51) Int. Cl.
*G05D 1/00* (2024.01)
*G05D 1/20* (2024.01)
(Continued)

(52) U.S. Cl.
CPC ............... *G08C 17/02* (2013.01); *G05D 1/00* (2013.01); *G05D 1/0022* (2013.01); *G05D 1/20* (2024.01);
(Continued)

(58) Field of Classification Search
CPC .. G08C 17/02; G05D 1/0022; G05D 2201/02; G05D 1/0027; G05D 1/00;
(Continued)

(56) References Cited

U.S. PATENT DOCUMENTS

2013/0338854 A1* 12/2013 Yamamoto ........... G05D 1/0246 701/2
2020/0073376 A1 3/2020 Yang
(Continued)

FOREIGN PATENT DOCUMENTS

EP 3522599 A1 8/2019
JP 2007241522 A 9/2007
(Continued)

OTHER PUBLICATIONS

Tastan, "Network Slicing", Jun. 26, 2019, 5 pages, retrieved from https://medium.com/@mcihantastan/network-slicing-e11eeedcabf0.

*Primary Examiner* — Marcus Hammonds
(74) *Attorney, Agent, or Firm* — Holtz, Holtz & Volek PC

(57) ABSTRACT

According to one embodiment, an electronic apparatus includes: a processor configured to: generate a control plan indicating an operation of at least a part of a control target apparatus during a predetermined duration; determine a first control plan associated with a portion of the control plan; generate a first control signal including the control plan and a second control signal including the first control plan; and command to transmit the first control signal by using a first wireless resource, and transmit the second control signal by using a second wireless resource different from the first wireless resource.

24 Claims, 7 Drawing Sheets

(51) Int. Cl.

| | |
|---|---|
| ***G05D 1/22*** | (2024.01) |
| ***G05D 1/221*** | (2024.01) |
| ***G08C 17/02*** | (2006.01) |
| ***H04L 67/125*** | (2022.01) |
| ***H04L 67/52*** | (2022.01) |
| ***H04W 48/18*** | (2009.01) |
| ***H04W 72/04*** | (2023.01) |

(52) U.S. Cl.
CPC ............... *G05D 1/22* (2024.01); *G05D 1/221* (2024.01); *H04L 67/125* (2013.01); *H04L 67/52* (2022.05); *H04W 48/18* (2013.01); *H04W 72/04* (2013.01)

(58) Field of Classification Search
CPC . G05D 1/20; G05D 1/22; G05D 1/221; H04L 67/125; H04L 67/52; H04L 67/12; H04W 48/18; H04W 72/04; H04W 4/40; H04W 4/42; H04W 4/44; H04W 4/46; H04W 4/48
See application file for complete search history.

(56) References Cited

U.S. PATENT DOCUMENTS

| | | | | |
|---|---|---|---|---|
| 2020/0264630 | A1 | 8/2020 | Sakurada | |
| 2021/0125493 | A1* | 4/2021 | Yamashita | G08G 1/091 |
| 2021/0397180 | A1* | 12/2021 | Thomas | G05D 1/0297 |

FOREIGN PATENT DOCUMENTS

| | | | |
|---|---|---|---|
| JP | 2016060015 | A | 4/2016 |
| JP | 6427372 | B2 | 11/2018 |
| JP | WO2018062286 | A1 | 7/2019 |
| JP | 2020038633 | A | 3/2020 |
| JP | 2020135320 | A | 8/2020 |
| WO | 2018062286 | A1 | 4/2018 |

* cited by examiner

ELECTRONIC APPARATUS, CONTROL TARGET APPARATUS, ELECTRONIC SYSTEM, METHOD, AND COMPUTER PROGRAM

CROSS-REFERENCE TO RELATED APPLICATIONS

This application is based upon and claims the benefit of priority from Japanese Patent Application No. 2020-149818, filed on Sep. 7, 2020; the entire contents of which are incorporated herein by reference.

FIELD

Embodiments described herein relate generally to an electronic apparatus, a control target apparatus, an electronic system, a method, and a computer program.

BACKGROUND

There is known a method of improving reliability by using a plurality of wireless resources when operation commands of a control target apparatus (for example, AGV, robot, drone, motor, etc.) is wirelessly controlled. When using a plurality of wireless resources, it is desirable to reduce the wireless resources used.

DETAILED DESCRIPTION

Figure 1:
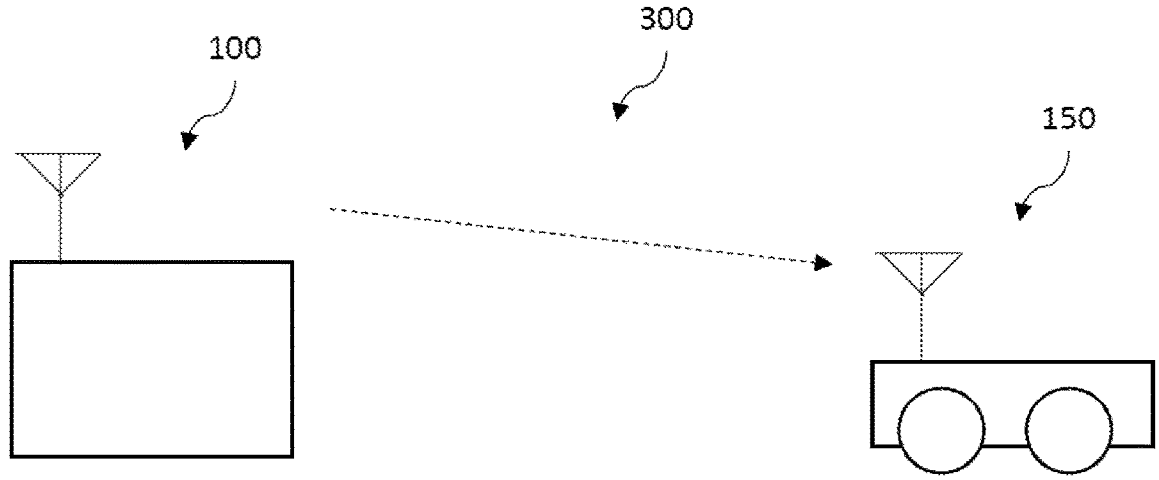
FIG. 1 is a conceptual diagram of a control system 300 according to the first embodiment.

According to one embodiment, an electronic apparatus includes: a processor configured to: generate a control plan indicating an operation of at least a part of a control target apparatus during a predetermined duration; determine a first control plan associated with a portion of the control plan; generate a first control signal including the control plan and a second control signal including the first control plan; and command to transmit the first control signal by using a first wireless resource, and transmit the second control signal by using a second wireless resource different from the first wireless resource.

Hereinafter, embodiments are described in reference to the drawings. The disclosures are only examples, and the embodiments are not limited by the contents described in the following embodiments. Modifications that can be easily conceived by those skilled in the art naturally fall within the scope of the disclosure. In the drawings, the size, shape, and the like may be schematically represented to make the description more clear. In the multiple drawings, corresponding elements are denoted by the same reference numbers, and detailed descriptions may be omitted.

First Embodiment

FIG. 1 illustrates a control system 300. In this system, a control apparatus 100 transmits a control signal for commanding an operation of a control target apparatus 150. The control target apparatus 150 controls the operation of each part of the control target apparatus 150 according to the received control signal. The control target apparatus 150 is, for example, an automatic guided vehicle (AGV), a robot, a drone, a robot arm, or the like, and may be a motor included in these devices. The control target apparatus 150 is driven so as to change a position of at least a part of the control target apparatus 150. For example, the control target apparatus 150 changes the position of the entire control target apparatus 150. Alternatively, the control target apparatus 150 may change the position of a part (for example, a robot or a part of joints in a robot arm) included in the control target apparatus 150. At this time, the case where there is no change in an apparent position of the control target apparatus 150 is also included. For example, a portion whose rotation or posture can be changed at the same position, a portion capable of generating pressure, generating light, generating sound, or the like may be controlled.

The command of the operation to the control target apparatus 150 is performed by commanding a target value of a physical quantity, whether to perform a predetermined action, or the like regarding at least a part of the operation of the control target apparatus 150 for each time during a predetermined duration. Here, the operation of the control target apparatus 150 represents at least one of a change in the position of at least a part of the control target apparatus 150 and execution of a predetermined action. Hereinafter, an information Including at least one of the target value of the physical quantity at each time during the predetermined duration and the presence or absence of the predetermined action is also referred to as a control plan. The physical quantity represents, for example, a position, a speed, an acceleration, or the like related to an operation of the control target apparatus 150. This control plan is included in the control signal and transmitted to the control target apparatus 150. The target value includes at least one of a position, a speed, and an acceleration. The position, velocity, and acceleration include not only values in a three-dimensional space but also a position, velocity, and acceleration in rotation. For example, the position includes an angle, a rotation angle, and a rotation speed, the speed includes a rotation speed and an angular speed, and the acceleration includes a rotation acceleration. The angle and the rotation angle may represent the orientation of the control target apparatus 150. The control target apparatus 150 receives the control signal and operates to realize the content of the control plan.

Here, the control apparatus 100 transmits the control signal to the control target apparatus 150 using a plurality of wireless resources. The plurality of wireless resources is different from each other in at least one of time, frequency, space, and code. That is, the control apparatus 100 transmits the control signal using at least one of time division, frequency division, space division, and code division. The space division means that antennas used for transmission of control signals are different from each other or beams used for transmission of control signals are different from each other even with the same antenna. For example, it is assumed that MIMO is used for the transmission.

The control apparatus 100 transmits the control signal using the plurality of wireless resources, and the control target apparatus 150 receives the control signal in at least one of the plurality of wireless resources. Thereby, the control target apparatus 150 can operate as commanded. That is, the wireless control of the control target apparatus 150 can be highly reliable.

At this time, the control apparatus 100 transmits a signal including a portion of the control plan in a part of the plurality of wireless resources. Hereinafter, this signal is also referred to as a partial control signal, and a portion of the control plan is also referred to as a partial control plan. The partial control signal includes a control plan in a portion of the duration of the control plan included in the control signal, information indicating a partial target value, information indicating presence or absence of the predetermined action, information indicating the partial target value in the portion of the duration, or information indicating presence or absence of the predetermined action in the portion of the duration. The control plan in the portion of the duration includes the control plan at one or more times in the portion of the duration.

The control apparatus 100 transmits the partial control signal in a part of the wireless resources among the plurality of the wireless resources, and thus it is possible to reduce the time, the frequency, and the like used for the communication in the part of the wireless resources while improving the reliability of the control of the control target apparatus 150.

Any wireless communication standard can be applied to communication between the control apparatus 100 and the control target apparatus 150. For example, wireless LANs, 3G, 4G, LTE, 5G, Bluetooth (registered trademark), and ZigBee (registered trademark). In the present embodiment, a case of a 5G will be described as an example.

Figure 2:
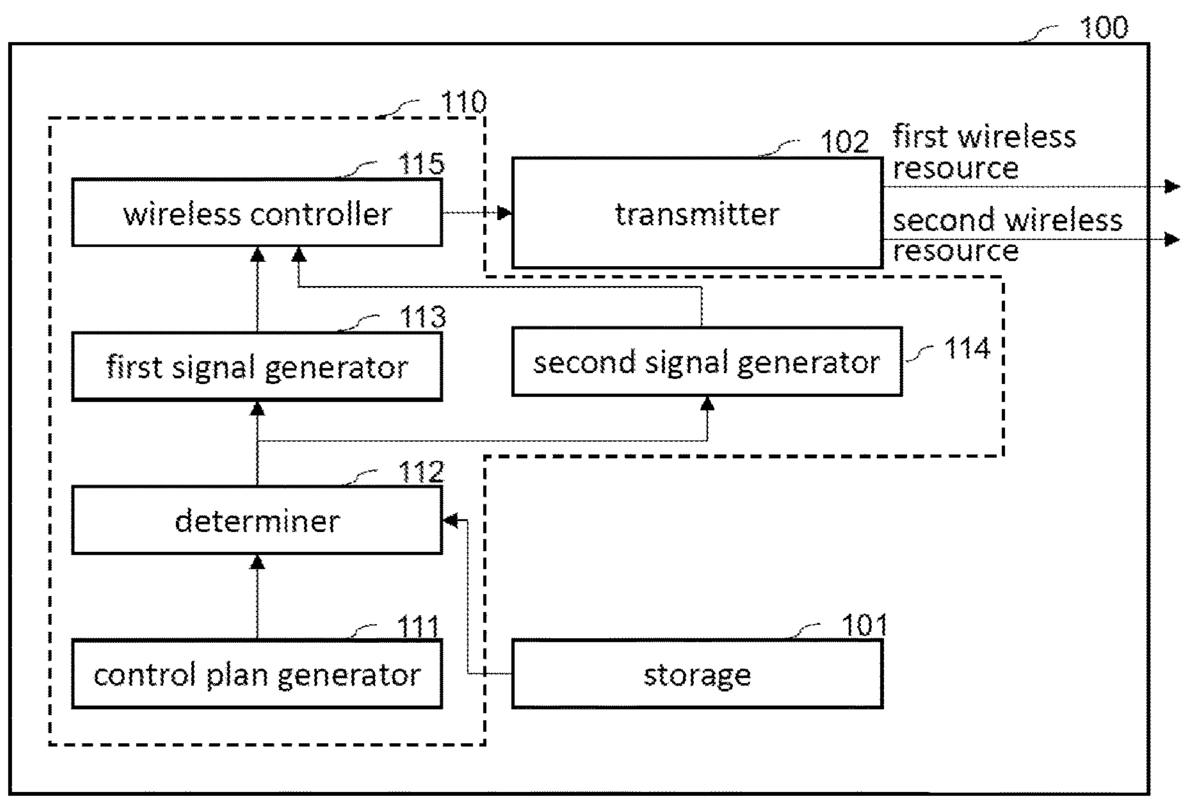
FIG. 2 is a block diagram of a control apparatus 100 according to the first embodiment.

FIG. 2 illustrates a block diagram of the control apparatus 100. The control apparatus 100 includes a storage 101, a transmitter 102, and a processor 110. The processor 110 includes a control plan generator 111, a determiner 112, a first signal generator 113, a second signal generator 114, and a wireless controller 115.

The storage 101 holds information indicating an influence related to the operation of at least a part of the control target apparatus 150, which is used by the determiner 112 to determine the partial control plan. Hereinafter, this information is also referred to as control risk information. The control risk information includes at least one of information indicating an influence of the control target apparatus 150 (hereinafter also referred to as operation risk information) and information indicating a possibility that wireless transmission to the control target apparatus 150 is not normally performed (hereinafter also referred to as transmission risk information). The operation risk information is the information indicating the influence of the control target apparatus 150 when at least a part of the control target apparatus 150 is not operated.

The operation risk information indicates the magnitude of influence on the control target apparatus 150 or on the surroundings of the control target apparatus 150 when the target value for each time and the presence or absence of a predetermined action included in the control plan of the control target apparatus 150 are not achieved. For example, the operation risk information indicates the magnitude of the possibility that the control target apparatus 150 is damaged, the magnitude of the possibility that the control target apparatus 150 damages surrounding objects or other devices by contact, or the like. The magnitude of these possibilities is determined according to the speed of the control target apparatus 150, the space (narrow or wide) in which the control target apparatus 150 exists, the positional relationship between the control target apparatus 150 and another device or object, and the like.

The transmission risk information indicates a possibility that the wireless transmission of the control signal to the control target apparatus 150 is not normally performed. The possibility that the wireless transmission is not normally performed is determined according to, for example, an error rate characteristic in the wireless transmission or the magnitude of delay of the wireless transmission. For example, the possibility that the wireless transmission is not normally performed changes depending on the error rate characteristic in the control system 300. The possibility that the control target apparatus 150 cannot perform the operation according to the control plan changes corresponding to the magnitude of delay of the wireless transmission.

The storage 101 is a memory or the like. For example, a random access memory (RAM), a programmable ROM (PROM), an erasable PROM (EPROM), an electrically EPROM (EEPROM), a flash memory, a register, or the like. Further, the storage 101 may be provided outside the control apparatus 100 as well as inside the control apparatus 100. In the case of being provided outside, the storage 101 may be a cloud that holds information via the Internet.

The control plan generator 111 generates a control plan including at least one of a target value of the physical quantity at each time and presence or absence of a predetermined action. When the position of the entire control target apparatus 150 is changed, the control plan generator 111 generates a control plan including a target value of the position (coordinates) of the control target apparatus 150 at each time. For example, the x coordinate, the y coordinate, and the z coordinate at time t are represented as (t, x, y, z). The control plans at the times t1 to t5 are represented as (t1, x1, y1, z1), (t2, x2, y2,), (t3, x3, y3, z3), (t4, x4, y4, z4), (t5, x5, y5, z5).

When the control target apparatus 150 is a robot, a robot arm, or the like, the position of a part (for example, a joint) of the control target apparatus 150 may be changed. In this case, the control plan generator 111 generates a control plan including a target value of the position (angle) of the control target apparatus 150 at each time. Here, the control plan may be a plan related to a change in position of each of a plurality of parts of the control target apparatus 150. For example, the angle θ of the first joint, the angle φ of the second joint, and the angle ω of the third joint at time t are represented as (t, θ, φ, ω). The control plans at times t1 to t5 are represented as (t1, θ1, φ1, ω1), (t2, θ2, φ1, ω1), (t3, θ2, φ2, ω1), (t4, θ2, φ2, ω3), and (t5, θ3, φ3, ω3).

The control target apparatus 150 may perform a predetermined action at a predetermined time. As the predetermined action, for example, the control target apparatus 150 may perform notification (alarm) by light, sound, display on a monitor, or the like, a gripping action (gripping operation), or the like at the predetermined time. In this case, the control plan generator 111 may include in the control plan whether or not to perform the predetermined action for each time. For example, the presence or absence of a predetermined action at time t is represented as (t, on) or (t, off). As an example, in the case of the control plan in which the position (angle) of the control target apparatus 150 at each time is set as described above, it is expressed as (t1, θ1, φ1, ω1, off), (t2, θ2, φ1, ω1, off), (t3, θ2, φ2, ω1, on), (t4, θ2, φ2, ω3, off), and (t5, θ3, φ3, ω3, off).

The determiner 112 determines a partial control plan related to a portion of the control plan transmitted from the control plan generator 111 based on the control risk information stored in the storage 101. The partial control plan is at least one of a control plan in the portion of the duration of the control plan, the partial target value, the presence or absence of the predetermined action, and the partial target value, the presence or absence of the predetermined action in the portion of the duration of the control plan.

The determiner 112 determines at which duration the control plan is determined as the partial control plan based on the magnitude of the control risk. For example, when the operation risk information is used as a reference, the determiner 112 calculates the magnitude of the influence of the control target apparatus 150 as an evaluation value when at least one of the target value and the presence or absence of the predetermined action for each time is not achieved. The determiner 112 compares the calculated evaluation value with a predetermined threshold value. When the evaluation value indicates that the magnitude of the influence of the control target apparatus 150 is larger than the threshold value, the determiner 112 determines a control plan during the time as the partial control plan.

In addition, when the transmission risk information is used as a reference, a possibility that the wireless transmission of the control signal to the control target apparatus 150 is not normally performed is calculated as an evaluation value the control signal to the control target apparatus 150 is calculated as an evaluation value. The determiner 112 compares the calculated evaluation value with a predetermined threshold value, and when the evaluation value indicates that the possibility that the wireless transmission of the control signal to the control target apparatus 150 is not normally performed is higher than the threshold value, determines the control plan of a portion of the duration of the control signal to be wirelessly transmitted as the partial control plan.

For example, when the position of the control target apparatus 150 is changed, the partial control plan is set as the control plan in time t2 to t4 with respect to the control plan represented by (t, x, y, z) described above. The partial control plans are represented as (t2, x2, y2, z2), (t3, x3, y3, z3), and (t4, x4, y4, z4).

When the control plan is a plan representing operations at a plurality of parts of the control target apparatus 150, the determiner 112 may determine a control plan representing operations at some parts as a partial control plan. The determiner 112 determines which portion of the control plan representing the operation is determined as the partial control plan based on the magnitude of the control risk. The evaluation value in this case is the magnitude of the influence of the control target apparatus 150 when the target value for each part and the presence or absence of the predetermined action are not achieved on a basis of the operation risk information. The case where the transmission risk information is used as a reference is the same as the case described above.

For example, when the position of a part of the control target apparatus 150 is changed, the partial control plan is a plan related to a change in the position of the part of the control target apparatus 150 with respect to the control plan represented by (t, θ, φ, ω) described above. As an example, when the control plan of the angle θ of the first joint is a partial control plan, (t1, θ1), (t2, θ2), (t3, θ2), (t4, θ2), and (t5, θ3) are represented as the partial control plan.

In some cases, the determiner 112 sets, as the partial control plan, a further part of the time from the plan representing the operation in a part of the plurality of parts of the control target apparatus 150 described above. As an example, when the control plan of the angle θ of the first joint at times t2 to t4 is a partial control plan, (t2, θ2), (t3, θ2), and (t4, θ2) are obtained. The time and the part to be set as the partial control plan are determined by evaluating the magnitude of the control risk in the same manner as described above.

The determiner 112 sends the control plan to the first signal generator 113 and the partial control plan to the second signal generator 114. The determiner 112 may not determine the partial control plan from the control plan as a result of comparing the evaluation value of the magnitude of the influence of the control target apparatus 150 with the threshold value. For example, the evaluation value indicates indicating the magnitude of the influence of the control target apparatus 150 is smaller than the threshold value. In this case, the determiner 112 sends the control plan to the first signal generator 113.

The first signal generator 113 generates a control signal including the control plan transmitted from the determiner 112. The second signal generator 114 generates a partial control signal including the partial control plan transmitted from the determiner 112. Since the partial control plan is a portion of the control plan, data size of the partial control plan is smaller than that of the control plan.

Here, the first signal generator 113 and the second signal generator 114 include identification information indicating the correspondence relationship in the control signal and the partial control signal so that the control target apparatus 150 can recognize that the control plan and the partial control plan are in the correspondence relationship. For example, the first signal generator 113 and the second signal generator 114 may assign the same identification ID to the control plan and the partial control plan having the correspondence relationship, or may assign corresponding identification IDs. Since the control plan and the partial control plan indicate the target value of the physical quantity or the presence or absence of a predetermined action at the same time, the control target apparatus 150 may associate the control plan with the partial control plan.

The first signal generator 113 may include identification information indicating that the control plan is included in the control signal, and the second signal generator 114 may include identification information indicating that the partial control plan is included in the partial control signal. The control target apparatus 150 can identify whether the received signal is the control signal or the partial control signal based on the identification information. When the determiner 112 does not determine the partial control plan, the first signal generator 113 may include information indicating that there is no partial control plan corresponding to the control plan in the control signal. Based on this information, the control target apparatus 150 can perform an operation of stopping reception after receiving the control signal.

The first signal generator 113 sends the generated control signal to the wireless controller 115. The second signal generator 114 sends the generated partial control signal to the wireless controller 115.

The wireless controller 115 commands the transmitter 102 to transmit the control signal transmitted from the first signal generator 113 using the first wireless resource. The wireless controller 115 commands the transmitter 102 to transmit the partial control signal transmitted from the second signal generator 113 using a second wireless resource different from the first wireless resource. The first wireless resource and the second wireless resource may be used wireless resources set in advance, or may be determined by the wireless controller 115 each transmission is performed.

The transmitter 102 includes one or more antennas, transmits the control signal to the control target apparatus 150 using the first wireless resource, and transmits the partial control signal to the control target apparatus 150 using the second wireless resource. The first wireless resource and the second wireless resource are network slices logically configured in one wireless communication standard. For example, when a cellular network such as LTE, 4G, or 5G is used to transmit the control signal and the partial control signal, the first wireless resource and the second wireless resource are network slices separated at least one of a MAC layer and a PHY layer. By using such network slices, the first wireless resource and the second wireless resource in at least one of time, frequency, and space.

The configuration of the control apparatus 100 has been described above. At least some of the components of the control apparatus 100 may be implemented by an integrated circuit such as an integrated circuit (IC) or a large scale integration (LSI). In FIG. 2, the control plan generator 111, the determiner 112, the first signal generator 113, the second signal generator 114, and the wireless controller 115 are included in the processor 110. The processor 110 is one or more electronic circuits including a control device and an arithmetic device. The electronic circuit is realized by an analog or digital circuit or the like. For example, a general purpose processor, a central processor (CPU), a microprocessor, a digital signal processor (DSP), an ASIC, a FPGA, and combinations thereof are possible.

Figure 3:
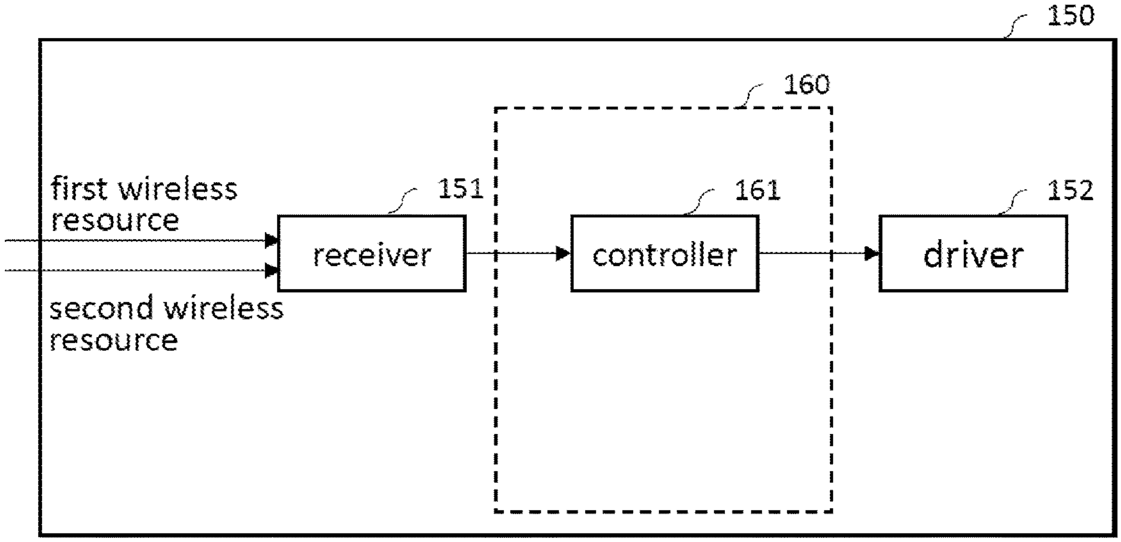
FIG. 3 is a block diagram of a control target apparatus 150 according to the first embodiment.

The control target apparatus 150 receives at least one of a control signal and a partial control signal from the control apparatus 100 and operates. For example, a robot that moves by wheels, a robot that walks by a plurality of legs, or the like, and includes a robot arm, a tip-movable endoscope, or the like. Other examples of the control target apparatus 150 include a vehicle, a carriage, and a flying object such as a manned airplane or an unmanned aerial vehicle (UAV), like a drone. In the present embodiment, as an example, the control target apparatus 150 will be described as a robot that moves by wheels. FIG. 3 illustrates a block diagram of the control target apparatus 150. The control target apparatus 150 includes a receiver 151, a driver 152, and a processor 160. The processor 160 includes a controller 161.

The receiver 151 includes one or more antennas and receives the control signal and the partial control signal transmitted from the control apparatus 100. The receiver 151 receives the control signal using the first wireless resource and receives the partial control signal using the second wireless resource. The receiver 151 sends the received control signal and partial control signal to the controller 161.

The controller 161 extracts the control plan from the control signal and the partial control plan from the partial control signal send from the receiver 151. The controller 161 drives the driver 152 so as to realize the operation of the control target apparatus 150 at each time included in the control plan and the partial control plan.

When the receiver 151 receives the control signal and the partial control signal and receives the control signal before the partial control signal, the controller 161 commands to realize operations of at least a part of the control target apparatus 150 based on the control plan. In this case, the controller 161 does not command based on the partial control plan. The partial control plan is a plan for reducing the influence of the operation of at least a part of the control target apparatus 150 even when the transmission of the control signal including the control plan is not performed or is delayed. Therefore, when the control plan is received by the control target apparatus 150, the controller 161 can command based on the control plan.

On the other hand, when the receiver 151 receives the control signal and the partial control signal and receives the partial control signal before the control signal, the controller 161 commands to realize operations of at least a part of the control target apparatus 150 based on the partial control plan. Thereafter, the controller 161 may command to realize operations of at least a part of the control target apparatus 150 which is not included in the partial control plan and is included in the control plan. For example, when the partial control plan does not include the presence or absence of a predetermined action (for example, notification, warning, or the like) and the control plan includes the presence or absence of a warning, the controller 161 commands to realize warning of the control target apparatus 150 based on the control plan.

The driver 152 is a driving device mounted on the control target apparatus 150. The driver 152 is, for example, a motor, a wheel, an engine, or a propeller. In the present embodiment, as an example, the driver 152 is described as the motor or wheel. The driver 152 is driven by a command from the controller 161 and drives at least a part of the control target apparatus 150. For example, when rotation speed of the motor of the driver 152 is commanded by the controller 161, the driver 152 drives at the commanded rotation value and direction. By driving of the driver 152, a change in the position of at least a part of the control target apparatus 150.

The configuration of the control target apparatus 150 has been described above. At least some of the components of the control target apparatus 100 may be implemented by an integrated circuit such as an IC or an LSI. In FIG. 3, the controller 161 is included in the processor 160. The processor 160 is one or more electronic circuits including a control apparatus and an arithmetic device. The electronic circuit is realized by an analog or digital circuit or the like. For example, general purpose processors, central processors, microprocessors, digital signal processors, ASICs, FPGAs, and combinations thereof are possible.

The control apparatus 100 of the present embodiment generates the control plan indicating the operation of at least a part of the control target apparatus 150 during a predetermined duration, and determines the partial control plan related to a portion of the control plan based on the control risk information. The control apparatus 100 generates the control signal including the control plan and the partial control signal including the partial control plan. The control apparatus 100 transmits the control signal to the control target apparatus 150 using the first wireless resource, and transmits the partial control signal to the control target apparatus 150 using the second wireless resource.

Figure 4:
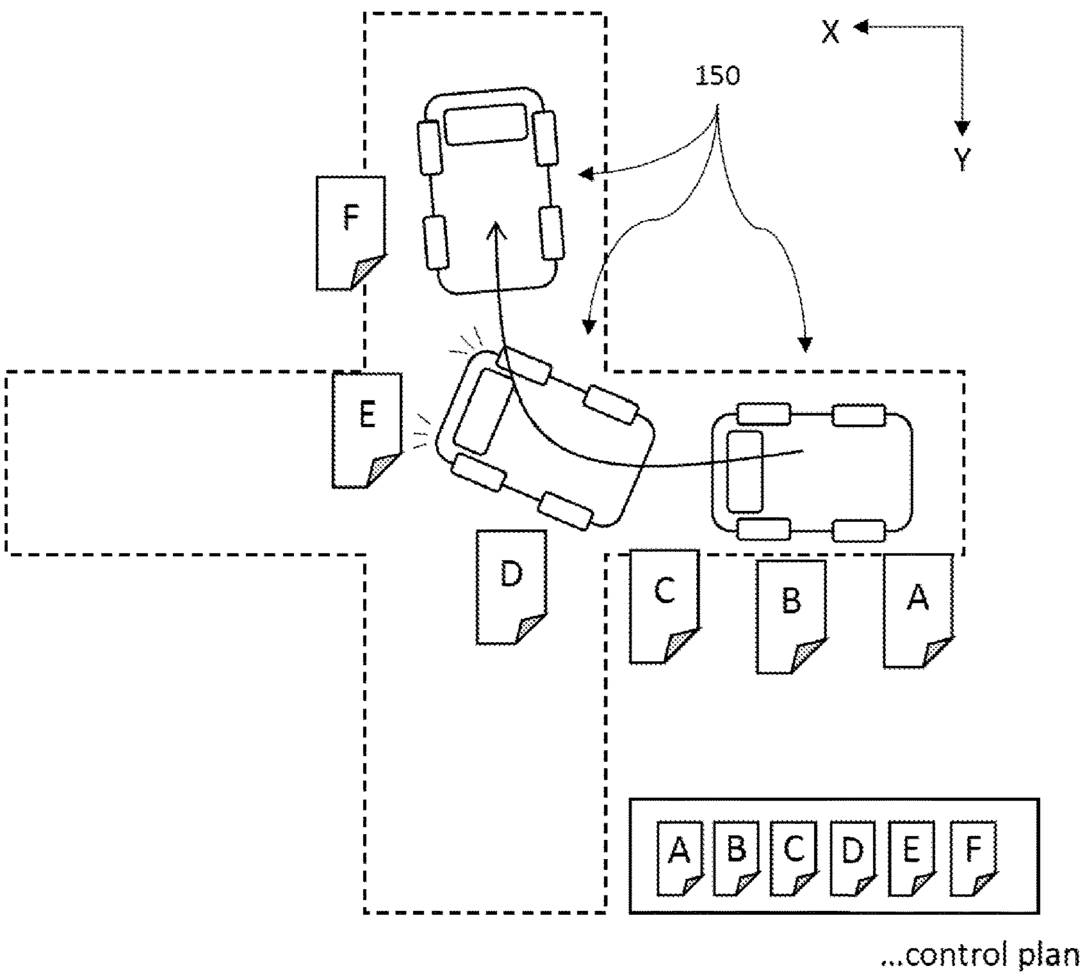
FIG. 4 is a diagram for explaining a control plan of the control target apparatus 150.

FIG. 4 is a diagram illustrating the control plan of the control target apparatus 150 as an example of the present embodiment. FIG. 4 illustrates that the control target apparatus 150 turns right at a crossroad indicated by a broken line. It is assumed that there is some object (wall or the like) other than the crossroads. In the present embodiment, the control plan represents the position (coordinates) of the control target apparatus 150 at each time. In the control plan, a plan A to a plan F are arranged in time series, and the plan A to the plan F indicate the presence or absence of a notification (for example, blinking of a lamp provided in the control target apparatus 150) accompanying at least one of a coordinate change and a direction change of the control target apparatus 150 at each time. The notification is the predetermined action in the present embodiment. As an example, the plan A is expressed as (tA, XA, YA, off), the plan B is expressed as (tB, XB, YB, on), the plan C is expressed as (tC, XC, YC, on), the plan D is expressed as (tD, XD, YD, on), the plan E is expressed as (tE, XE, YE, on), and the plan F is expressed as (tF, XF, YF, off).

In FIG. 4, the control target apparatus 150 goes straight in the plans A and B, turns right in the plans C, D, and E, and goes straight again in the plan F. In this case, when the control plan is not transmitted to the control target apparatus 150 or the transmission is delayed in the middle of the right turn from the plans C to E, there is a high possibility that the right turn is not completed and the vehicle collides with the wall. The collision with the wall may cause damage to the control target apparatus 150 or damage to the wall. On the other hand, in the case of going straight such as the plans A, B, and F, when the control plan is not transmitted to the control target apparatus, or the transmission is delayed, the possibility of collision with the wall is lower than that of the control target apparatus 150 turning right. Therefore, the control apparatus 100 calculates the evaluation value indicating the magnitude of the influence related to the operation of the control target apparatus 150 based on the control risk information for the plans A to F. Here, as an example, the operation risk information indicating the magnitude of the influence of the control target apparatus 150 when the target value for each time and the presence or absence of the predetermined action are not achieved is used as the control risk information.

Figure 5:
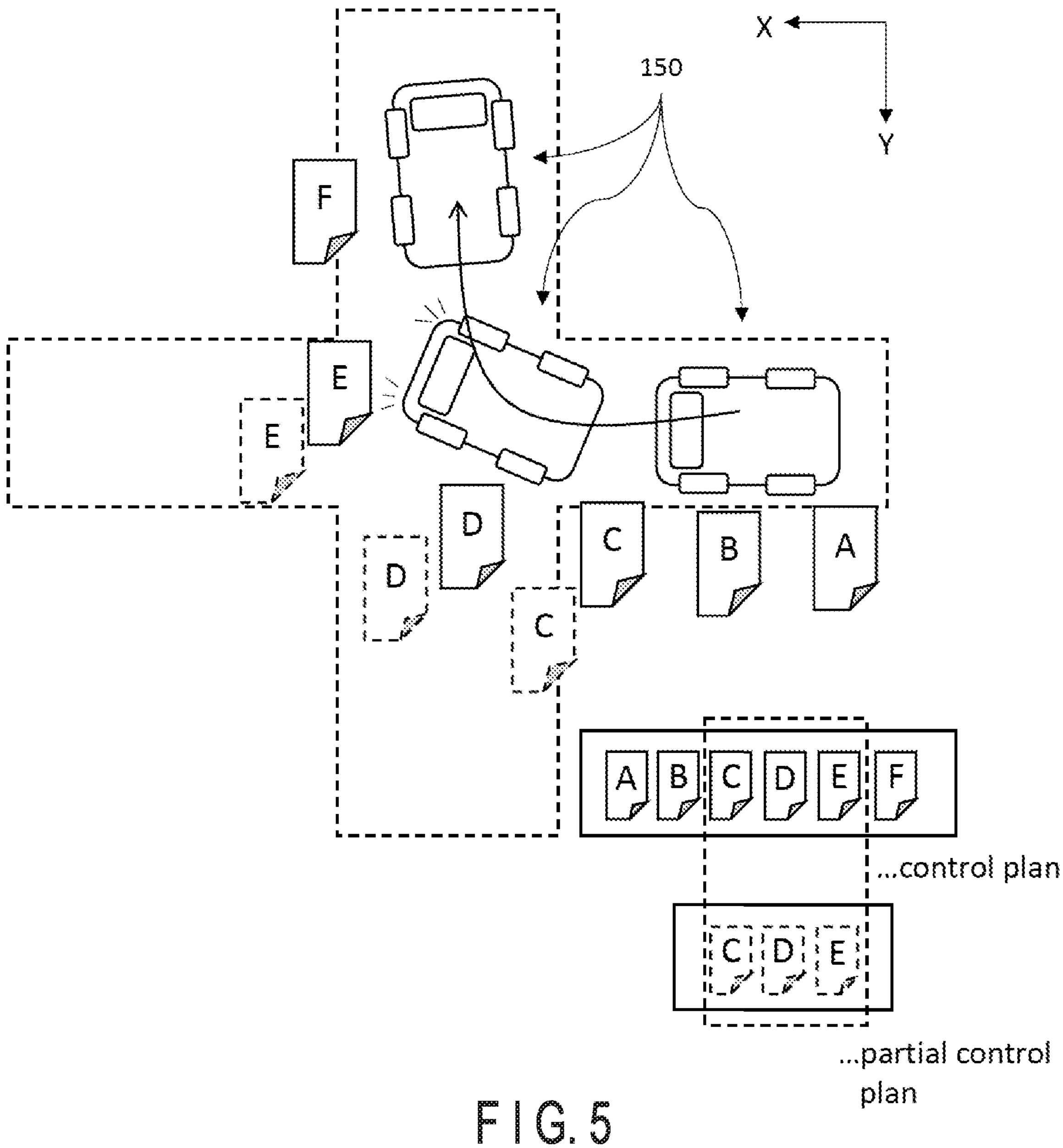
FIG. 5 is a diagram for explaining a partial control plan of the control target apparatus 150 in FIG. 4.

FIG. 5 is a diagram illustrating the partial control plan determined by the control apparatus 100. The control apparatus 100 determines the plans C, D, and E as partial control plans by comparing the evaluation value calculated by the control apparatus 100 with the threshold value. In addition, in the present embodiment, in order to further reduce data size of the partial control plan, the control apparatus 100 determines that the partial control plan does not include the presence or absence of the notification accompanying the direction change of the control target apparatus 150 from the plans C, D, and E.

The control apparatus 100 generates control signals including the plans A to F as control plans, and generates partial control signals using the plans C to E as partial control plans. The control apparatus 100 transmits the control signal by the first wireless resource and transmits the partial control signal by the second wireless resource. In the present embodiment, the control apparatus 100 transmits the plans A to F in chronological order. The control apparatus 100 transmits the plans C to E included in the control signal and the partial control signal, respectively, and transmits the plans A, B, and F included in the control signal. The control apparatus 100 may collectively include at least some of the plans A to F in the control signal or the partial control signal. In the present embodiment, it is assumed that the first wireless resource and the second wireless resource are determined in advance.

Figure 6:
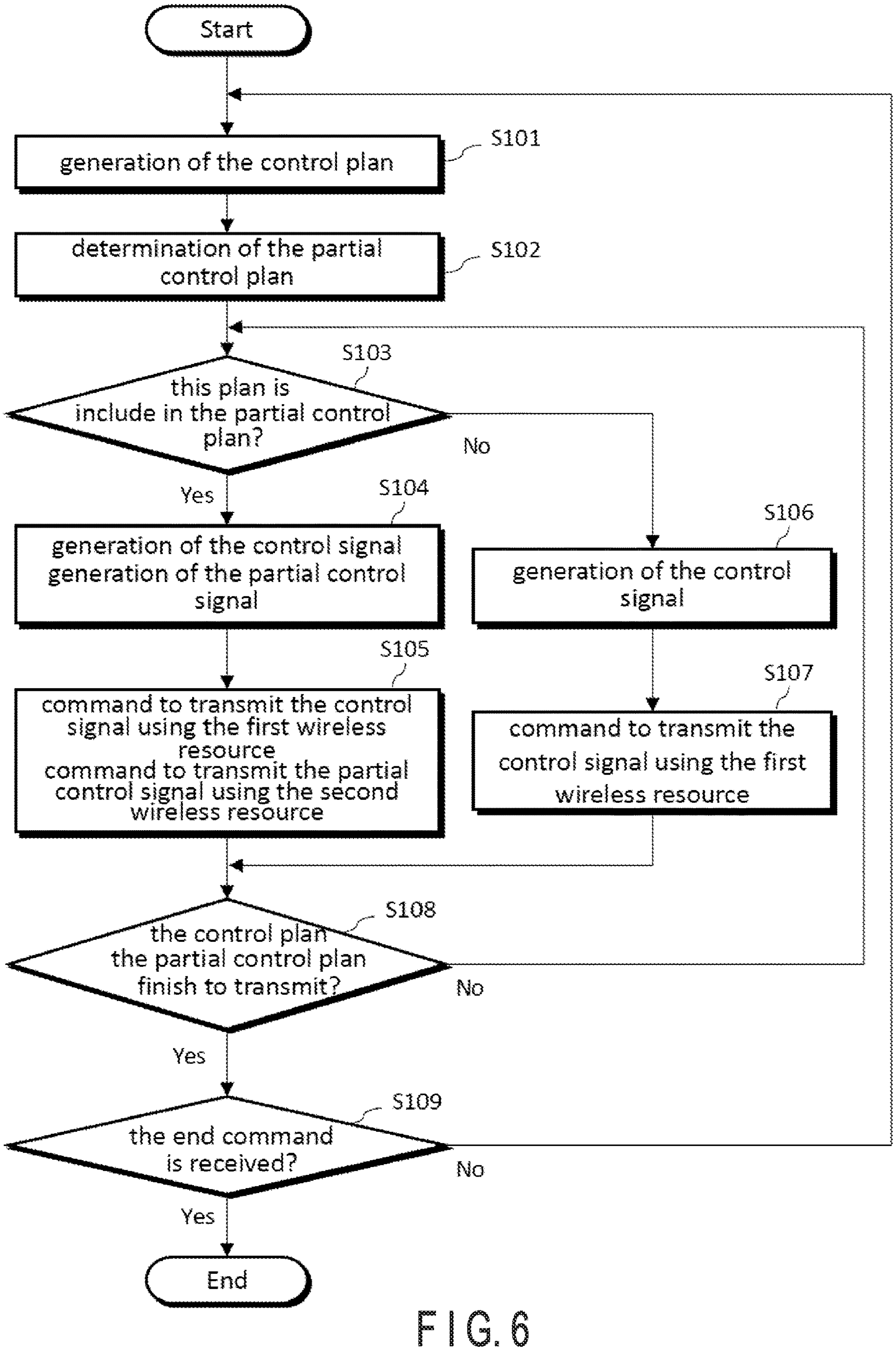
FIG. 6 is a flowchart showing the operation of the processor 110.

The control plan and the partial control plan according to the present embodiment have been described above. FIG. 6 is a flowchart of an operation in the processor 110 of the control apparatus 100. The operation of the processor 110 will be described with reference to FIG. 6.

The control plan generator 111 generates the control plan representing an operation of at least a part of the control target apparatus 150 during a predetermined duration (step S101). In the examples of FIGS. 4 and 5, the control plan generator 111 generates the plans A to F of positions (coordinates) of the control target apparatus 150 at times tA to tF as the control plan. The control plan generator 111 sends the generated control plan to the determiner 112.

The determiner 112 determines the partial control plan related to a portion of the control plan based on the control risk information (step S102). In the examples of FIGS. 4 and 5, the determiner 112 determines the plans C to E as the partial control plans based on the operation risk information. In addition, in order to further reduce data size of the partial control plan, the determiner 112 deletes, from the plans C to E, the presence or absence of the notification accompanying the direction change of the control target apparatus 150. That is, the plans C to E are included in both the control plan and the partial control plan, and the plans A, B, and F are included only in the control plan. In FIGS. 4 and 5, the determiner 112 determines the partial control plan, but the determiner 112 may not determine the partial control plan from the control plan. For example, the evaluation value indicates that the magnitude of the influence related to the operation of at least the part of the control target apparatus 150 is smaller than the threshold value.

The determiner 112 checks whether a plan to be transmitted is included in the partial control plan (step S103). In the examples of FIGS. 4 and 5, the plans C to E are included in both the control plan and the partial control plan, and the plans A, B, and F are included only in the control plan. In the case of a plan included in the partial control plan (step S103: Yes), the determiner 112 sends the plan to the first signal generator 113 and the second signal generator 114. The process proceeds to step S104. In the examples of FIGS. 4 and 5, the plans C to E are applicable. On the other hand, when it is not included in the partial control plan (step S103: No), the determiner 112 sends the plan to the first signal generator 113. The process proceeds to step S106. In the examples of FIGS. 4 and 5, the plans A, B, and F are applicable.

The first signal generator 113 generates the control signal including the control plan, and the second signal generator 114 generates the partial control signal including the partial control plan (step S104). Identification information for associating the control plans A to F with the partial control plans C to E is attached to the control signal and the partial control signal. Identification Information for identifying the control signal and the partial control signal may be attached to at least one of the control signal and the partial control signal. In the examples of FIGS. 4 and 5, the plans C to E are applicable, and these plans are included in the control signal and the partial control signal. The first signal generator 113 sends the control signal to the wireless controller 115, and the second signal generator 114 sends the partial control signal to the wireless controller 115.

The wireless controller 115 commands the transmitter 102 to transmit the control signal sent from the first signal generator 113 using the first wireless resource. The wireless controller 115 commands the transmitter 102 to transmit the partial control signal sent from the second signal generator 114 using the second wireless resource (step S105). The wireless controller 115 notifies the determiner 112 that the determiner 112 has been commanded to transmit the control signal and the partial control signal. Thereafter, the process proceeds to step S108.

On the other hand, the first signal generator 113 generates the control signal including the control plan (step S106). The first signal generator 113 may generate the control signal including information indicating that there is no partial control plan corresponding to the control plan. In the examples of FIGS. 4 and 5, the plans A, B, and F are applicable, and these plans are included only in the control signal. The first signal generator 113 sends the control signal to the wireless controller 115. The wireless controller 115 commands the transmitter 102 to transmit the control signal sent from the first signal generator 113 using the first wireless resource (step S107). The wireless controller 115 notifies the determiner 112 that the wireless controller 115 has been commanded to transmit the control signal. Thereafter, the process proceeds to step S108.

The determiner 112 confirms whether all the generated and determined control plans and partial control plans have been transmitted to the control target apparatus 150 (step S108). When at least one of the control plan and the partial control plan has not been transmitted (step S108: No), the process returns to step S103. In the examples of FIGS. 4 and 5 the plans A to E are included in at least one of the control signal and the partial control signal and transmitted. In this case, since an untransmitted plan remains, the process returns to step S103. On the other hand, when all of the generated and determined control plan and partial control plan are transmitted to the control target apparatus 150 (step S108: Yes), the process proceeds to step S109.

The determiner 112 checks whether or not an end command to end the operation of the control apparatus 100 has arrived (step S109). This end command is a command to end the operation of the control apparatus 100 in this flow. The end command is sent to the determiner 112 by the user inputting to the control apparatus 100 or by the control apparatus 100 acquiring a signal including the end command. The end command may be a command to immediately end the operation of the control apparatus 100.

When the determiner 112 has not received the end command (step S109: No), the process returns to step S101. On the other hand, when the determiner 112 has received the end command (step S109: Yes), the flow ends, and the control apparatus 100 ends the operation.

Figure 7:
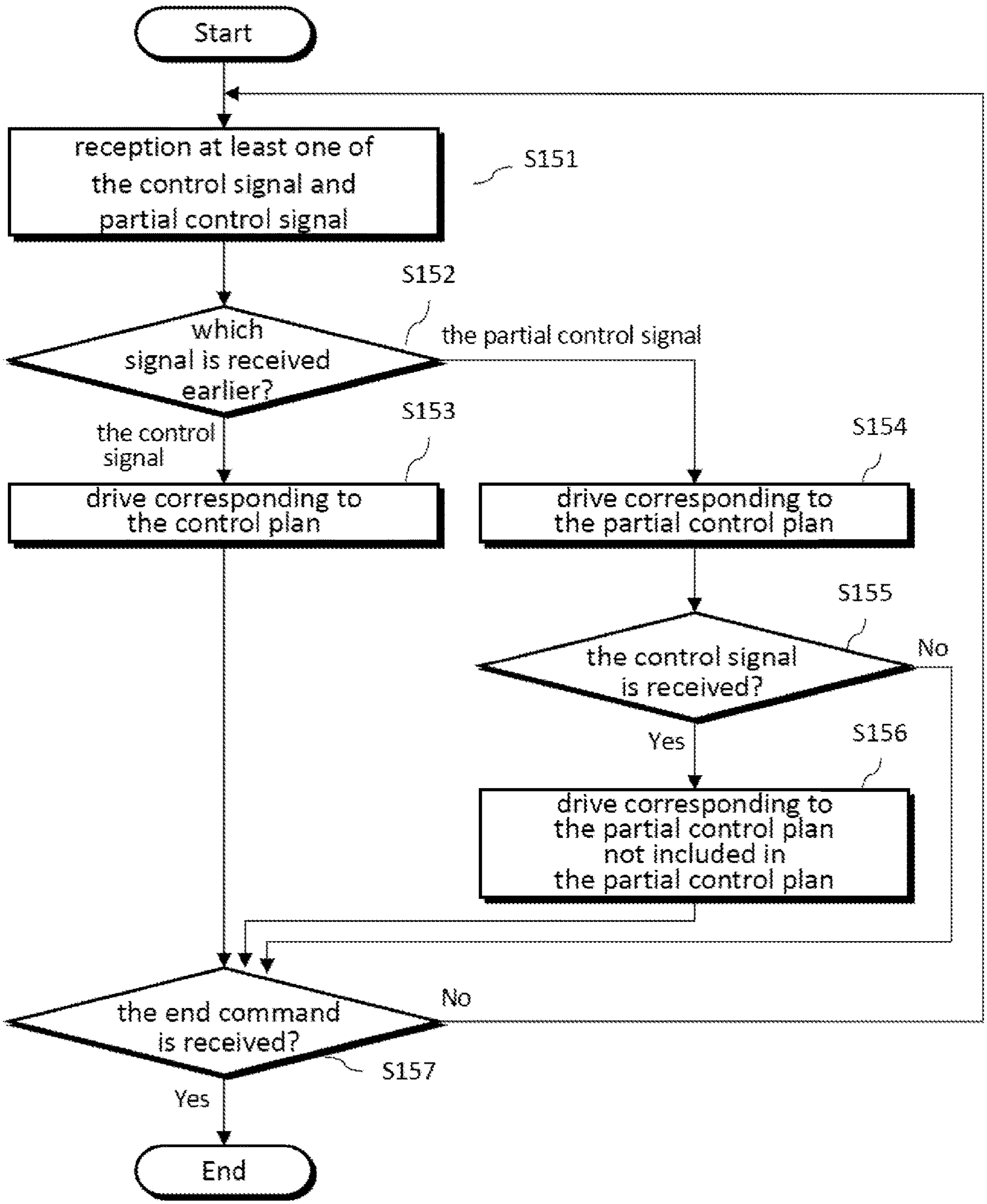
FIG. 7 is a flowchart of the operation of the control target apparatus 150.

The operation of the control apparatus 100 (processor 110) according to the present embodiment has been described above. The operation of the control target apparatus 150 will be described below. FIG. 7 is a flowchart of an operation of the control target apparatus 150. The control target apparatus 150 receives the control signal and the partial control signal transmitted from the control apparatus 100. In response to the previously received signal of the control signal and the partial control signal, the control target apparatus 150 is driven so as to realize at least a part of the operation of the control target apparatus 150 based on the control plan or the partial control plan included in the received signal.

When the previously received signal is the control signal, the control target apparatus 150 is driven based on the control plan and is not driven based on the partial control plan. When the previously received signal is the partial control signal, the control target apparatus 150 is driven based on the partial control plan. When the control target apparatus 150 receives the control signal later, the control target apparatus 150 drives so as to realize operations of at least a part of the control target apparatus 150 included in the control plan, not included in the partial control plan.

The receiver 151 includes one or more antennas and receives at least one of the control signal and the partial control signal (step S151). As an example, in the present embodiment, it is assumed that the partial control signal is received first and the control signal is received later. The receiver 151 sends at least one of the received control signal and partial control signal to the controller 161.

The controller 161 checks the previously received signal among the control signal and the partial control signal (step S152). When the receiver 151 cannot receive both signals or when the transmitter 102 of the control apparatus 100 transmits only the control signal, the controller 161 determines the received signal as the previously received signal.

When the signal previously received by the receiver 151 is the control signal (step S152: control signal), the controller 161 extracts the control plan from the control signal and commands the driver 152 to realize an operation of at least a part of the control target apparatus 150 based on the control plan. The driver 152 is driven in accordance with the command from the controller 161, and realizes the operation of the control target apparatus 150 in accordance with the control plan (step S153). In this case, the controller 161 does not commands based on the partial control plan corresponding to the control plan. Thereafter, the process proceeds to step S157.

On the other hand, when the signal previously received by the receiver 151 is the partial control signal (step S152: partial control signal), the controller 161 extracts the partial control plan from the partial control signal and commands the driver 152 to realize an operation of at least a part of the control target apparatus 150 based on the partial control plan. The driver 152 is driven in accordance with the command from the controller 161, and realizes the operation of at least a part of the control target apparatus 150 in accordance with the partial control plan (step S154). In the present embodiment, the controller 161 causes the driver 152 to drive such that the position (coordinates) of the control target apparatus 150 at times tC to tE changes from (XC, YC) to (XE, YE) as the partial control plan.

After commanding the drive based on the partial control plan, the controller 161 confirms whether or not the receiver 151 has received the control signal (step S155). When the receiver 151 has not received the control signal corresponding to the partial control signal (step S155: No), the process proceeds to step S157.

On the other hand, when the receiver 151 has already received the control signal corresponding to the partial control signal (step S155: Yes), the controller 161 extracts the control plan from the control signal. the controller 161 commands the driver 152 to realize an operation of at least a part of the control target apparatus 150 not included in the partial control plan based on the control plan. The driver 152 drives in accordance with the command from the controller 161 (step S156). In the present embodiment, the notification accompanying the direction change of the control target apparatus 150 is not included in the partial control plan, and is included in the control plan. At times tB to tE, the controller 161 commands the driver 152 to perform notification associated with the direction change of the control target apparatus 150, and the driver 152 is driven in accordance with the command from the controller 161. Thereafter, the process proceeds to step S157.

The controller 161 checks whether or not an end command to end the operation of the control target apparatus 150 has arrived (step S157). This end command is a command to end the operation of the control target apparatus 150 in this flow. The end command is sent to the controller 161 by the user inputting to the control target apparatus 150 or by the control target apparatus 150 acquiring a signal including the end command. The end command may be a command to immediately end the operation of the control target apparatus 150.

When the controller 161 has not received the end command (step S157: No), the process returns to step S151. On the other hand, when the controller 161 has received the end command (step S157: Yes), the flow ends, and the control target apparatus 150 ends the operation.

The operations of the control apparatus 100 and the control target apparatus 150 according to the present embodiment have been described above. Various modifications of the control apparatus 100 and the control target apparatus 150 can be implemented and executed. Hereinafter, modifications applicable to the present embodiment will be described.

(Modification 1)

The partial control plan has been described as a portion of the control plan in this embodiment. As an example, the control plan at a part of the time, or the control plan of some of the parts of the control target apparatus 150 in the case of changing the positions of a plurality of parts of the control target apparatus 150 are described as the partial control plan.

As another example, a partial control plan in a case where the control plan performs the same operation a plurality of times will be described. For example, the control plan is assumed in which 1m advancement of the control target apparatus 150 is repeated N times (N is an integer of 2 or more). In this modification, it is assumed that N is 10 times.

When the control target apparatus 150 does not move forward when the control signal including the control plan is not received, it is assumed that the operation risk information defines that the possibility of collision with another moving apparatus increases. In this case, even if the control target apparatus 150 does not conform to the control plan, the possibility of collision with another apparatus can be reduced by the control target apparatus 150 slightly moving. The determiner 112 determines a partial control plan which is a portion of the control plan and in which 1m advancement of the control target apparatus 150 is repeated M times (M<N, M is an integer).

(Second Modification)

The partial control signal is a signal including the partial control plan corresponding to the control signal. Various aspects of the partial control signal are applicable. For example, the partial control signal may be a signal obtained by copying the control signal or a signal obtained by simplifying the control signal. As the simplification of the control signal, for example, the bit width may be reduced by reducing the gradation of the physical quantity of the control plan, or by not including information of low importance. In the present embodiment, as an example of simplification of the control signal, when the positions of a plurality of parts of the control target apparatus 150 are changed, the partial control plan is a control plan at the position of some of the parts of the control target apparatus 150 are described. By simplifying the control signal, data size of the partial control signal is reduced, the possibility of transmission error of the partial control signal is reduced, and the delay in transmission of the partial control signal can be reduced. That is, the wireless control of the control target apparatus 150 can be highly reliable.

(Third Modification)

In this embodiment, two wireless resources are used, the number of wireless resources is not limited to two, and three or more wireless resources may be used. The determiner 112 may determine a plurality of partial control plans according to the number of wireless resources to be used. For example, when two partial control plans are determined, the partial control plan 1 may be the same as or different from the partial control plan 2.

(Fourth Modification)

In the present embodiment, the first wireless resource and the second wireless resource are described as network slices logically configured in one wireless communication standard. Different communication standards may be used for the first wireless resource and the second wireless resource. For example, any combination of 4G and 5G, a combination of a cellular network and a wireless local area network (LAN), a combination of a wireless local area network (LAN) and Bluetooth, and the like can be used. By using different communication standards for the first wireless resource and the second wireless resource, at least one of time, frequency, space, and code can be made different.

(Fifth Modification)

The first wireless resource and the second wireless resource may be configured differently. For example, the error rate characteristic and the delay characteristic may be set to be different between the first wireless resource and the second wireless resource.

Regarding the error rate characteristic, the second wireless resource may be set to have a better error rate characteristic than the first wireless resource. Examples of the setting with the better error rate characteristics include setting the second wireless resource to a lower coding rate, setting the number of modulation levels to a smaller value, and setting the transmission power of a signal to a larger value, as compared with the setting of the first wireless resource. These settings with the better error rate characteristics generally use more frequency resources (wireless resources). Therefore, a setting having the better error rate characteristic is used not for the first wireless resource for transmitting the control signal but for the second wireless resource for transmitting the partial control signal. Since the partial control plan included in the partial control signal is determined by the magnitude of the control risk, the second wireless resource is not always used. That is, it is possible to improve the reliability of wireless control of the control target apparatus 150 while reducing wireless resources to be used.

Regarding the delay characteristic, the second wireless resource may be set to have a better delay characteristic than the first wireless resource. For example, the partial control signal transmitted using the second wireless resource may be set to be transmitted with priority over other signals. Accordingly, the possibility that at least the partial control plan is transmitted to the control target apparatus 150 increases, and it is possible to reduce the influence on the control target apparatus or its surrounding by the wireless target apparatus 150.

(Sixth Modification)

Ensuring of the second wireless resource is not described in the present embodiment, in order to achieve both transmission of the partial control signal by the second wireless resource and reduction of the wireless resource to be used, for example, the following method is applicable.

The wireless controller 115 may maintain a state in which transmission of the partial control signal can be started for the second wireless resource. Here, it is not always necessary to continue to use frequency resources (wireless resources) the for transmission. For example, the wireless controller 115 performs initial connection between the control apparatus 100 and the control target apparatus 150, and maintains connection state.

The wireless controller 115 acquires the information indicating the control plan and the control risk information, and estimates the time at which the second wireless resource is used based on these information. The wireless controller 115 may ensure that the second wireless resource is available by the time when the second wireless resource is used. Note that the wireless controller 115 may acquire information indicating when the second wireless resource is used.

In addition, the wireless controller 115 may release the second wireless resource when the interval between the time when the second wireless resource is used and the current time is longer than a predetermined time. The opening represents, for example, a transition from a connected state between the control apparatus 100 and the control target apparatus 150 to an unconnected state. The predetermined time is determined based on the time required for the transition from the unconnected state to the connected state between the control apparatus 100 and the control target apparatus 150. In this way, it is possible to further reduce consumption of the second wireless resource in a time slot in which the second wireless resource is not used.

(Modification 7)

In the present embodiment, the control apparatus 100 controls an operation of at least a part of control target apparatus 150. The number of control target apparatuses 150 is not limited to one, and the control apparatus 100 may control a plurality of control target apparatuses 150.

In this case, when the control signal and the partial control signal are transmitted to each control target apparatus 150, each control signal may be transmitted sharing the first wireless resource and each partial control signal may be transmitted sharing the second wireless resource, or some signals may be transmitted using the L-th wireless resource (L: an integer of 3 or more).

(Modification 8)

In the present embodiment, the operation of the control target apparatus 150 represents at least one of a change in the position of at least a part of the control target apparatus 150 and whether to execute a predetermined action. The operation of the control target apparatus 150 may include various operations other than the present embodiment. For example, controlling an electronic device or a system included in the control target apparatus 150 is also included in the operation of the control target apparatus 150.

Specifically, when the control target apparatus 150 includes a camera or the like as the electronic device, the operation of the control target apparatus 150 includes control of the orientation of the camera, the resolution of an image captured by the camera, the shutter speed and the frame rate of the camera, and the like. When the control target apparatus 150 includes a sensor as an electronic device, the operation of the control target apparatus 150 includes control of an orientation of the sensor, a physical quantity acquired by the sensor, a frequency of acquiring the physical quantity of the sensor, and the like. Further, the operation of the control target apparatus 150 includes control of a brake system that controls speed of the control target apparatus 150, control of light, temperature, and the like by at least a part of the control target apparatus 150, control of a transmission speed when the control target apparatus 150 transmits data, and the like.

(Modification 9)

The functions performed by the components of the control apparatus 100 may be realized by a processing device similar to the processor 110 processing a program. The processing device processes the program to realize each component included in the processor 110 described in FIG. 2. This program may be provided by being stored in a computer-readable storage medium such as a CD-ROM, a memory card, a CD-R, and a digital versatile disk (DVD) as a file in an installable format or an executable format. The program may be stored in a computer connected to a network such as the Internet and provided via the network, or may be incorporated into a storage medium such as a ROM, an HDD, or an SSD and provided.

The modification of the present embodiment has been described above. These modifications may be used in combination. The control apparatus 100 according to the present embodiment generates the control plan representing the operation of at least a part of the control target apparatus 150 during the predetermined duration, and determines the partial control plan of a portion of the control plan based on the control risk information. The control apparatus 100 generates the control signal including the control plan and the partial control signal including the partial control plan. The control apparatus 100 commands to transmit the control signal towards the control target apparatus 150 using the first wireless resource and commands to transmit the partial control signal towards the control target apparatus 150 using the second wireless resource.

The control apparatus 100 transmits the partial control signal using a part of the wireless resources among the plurality of wireless resources, and thus it is possible to reduce time, a frequency band, and the like used for communication in the part of the wireless resources while improving the reliability of control of the control target apparatus 150.

Second Embodiment

Figure 8:
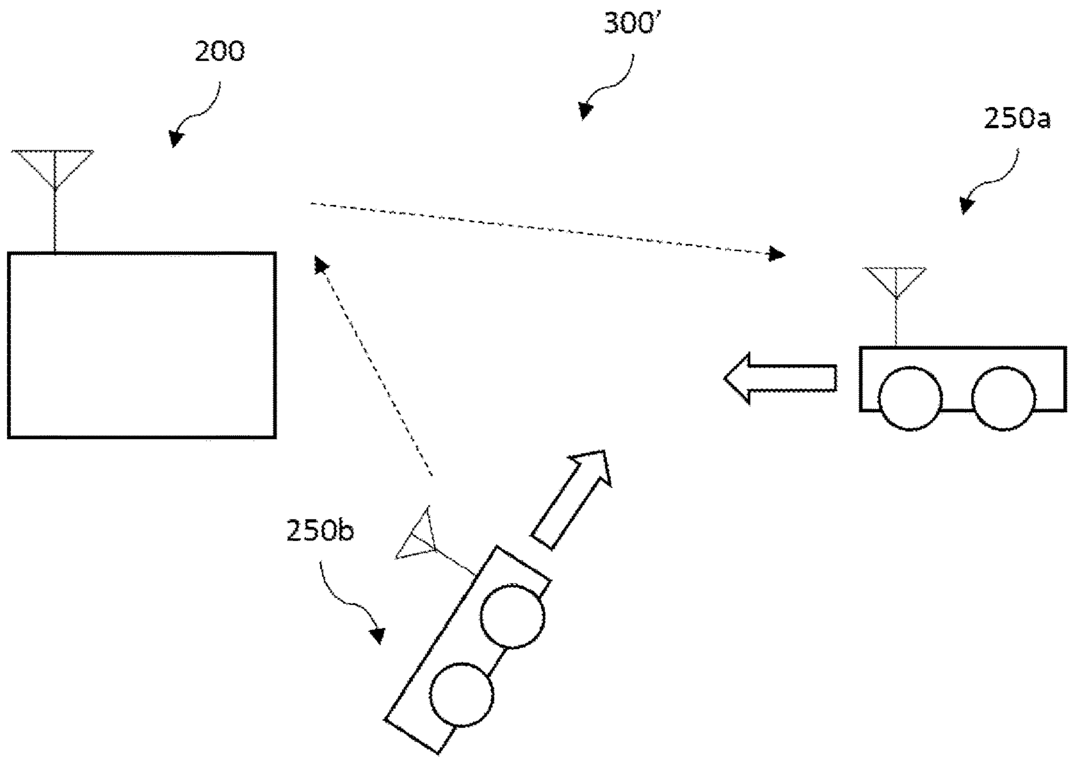
FIG. 8 is a conceptual diagram of a control system 300' according to the second embodiment.

FIG. 8 illustrates a control system 300' in this embodiment. In this system, a control apparatus 200 controls operations of a at least a part of a control target apparatus **250*a* and at least a part of a control target apparatus 250*b*** during a predetermined duration.

In this case, due to an operation (for example, a change in position) of at least a part of one control target apparatus 250 (for example, the control target apparatus **250*b*), a control risk of the other control target apparatus 250 (for example, the control target apparatus 250*a*) may vary. In addition, the control risk in the next control of the control target apparatus 250*a* may vary due to the operation of at least a part of the control target apparatus 250*a*. For example, the operation risk of the control target apparatus 250*a*** may vary.

As an example, in FIG. 4, the case where the control target apparatus 150 turns right at a crossroad has been described. Similarly, a case where the control target apparatus 250 turns right at a crossroad will be described. At this time, it is assumed that an opposing control target apparatus **250*b* exists before the control target apparatus 250*a* turns right. When the control target apparatus 250*b* operates to approach the control target apparatus 250*a*, the control target apparatus 250*a* needs to turn right while avoiding collision with not only the control target apparatus 250*b* but also objects on the crossroads. That is, there is a possibility that the control risk of the control target apparatus 250*a* increases due to the operation of at least a part of the control target apparatus 250*b*. In this case, the control apparatus 200 needs to generate the control plan for turning right of the control target apparatus 250*b* also based on the change in the position of the control target apparatus 250*a***.

In FIG. 4, even when the control target apparatus **250*b* does not exist, the operation of the control target apparatus 250*a* may not be in accordance with the control plan commanded earlier. That is, there is a possibility that the next control risk of the control target apparatus 250***a* Increases due to the operation of at least a part of the control target apparatus 250*a*. In this case, the control apparatus 200 needs to regenerate the control plan for the right turn of the control target apparatus 250*a* based on the change in the position of the control target apparatus 250*a*.

In the present embodiment, the control target apparatus 250*a* and the control target apparatus 250*b* measures physical quantities of themselves. This physical quantity is the same as that described in the first embodiment. The control apparatus 200 acquires information indicating a physical quantity of at least one of the control target apparatus 250*a* and the control target apparatus 250*b* (hereinafter, also referred to as physical quantity information), and generate the control plan of the control target apparatus 250*a* further based on the physical quantity information. More specifically, the control apparatus 200 estimates or confirms the position of at least a part of the control target apparatus 250*a* from physical quantity information of the control target apparatus 250*a* (hereinafter also referred to as physical quantity information a), and estimates or confirms the position of at least a part of the control target apparatus 250*b* from physical quantity information of the control target apparatus 250*b* (hereinafter also referred to as physical quantity information b). The control apparatus 200 generates the control plan of the control target apparatus 250*a* further based on at least one of the position of at least a part of the control target apparatus 250*a* and the position of at least a part of the control target apparatus 250*b*. Note that the operation of the control apparatus 200 after the control apparatus 200 generates the control plan of the control apparatus 250*a* is the same as the operation of the control apparatus 100 of the first embodiment, and description thereof will be omitted.

Figure 9:
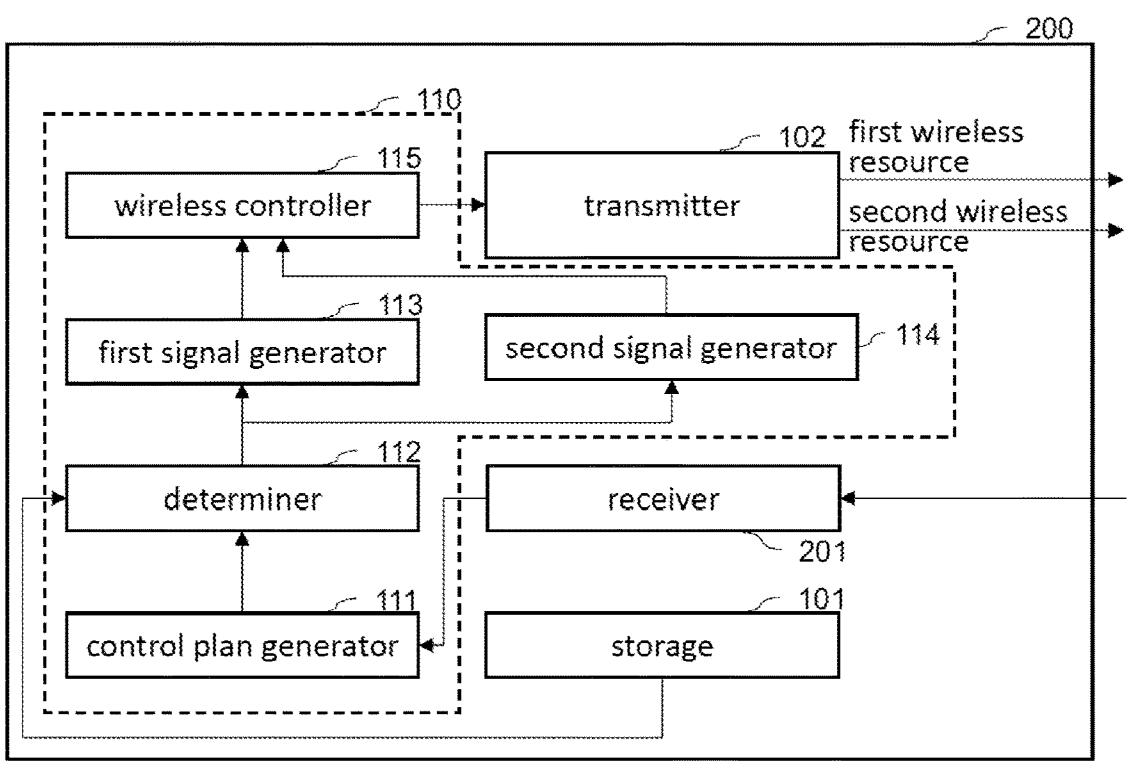
FIG. 9 is a block diagram of a control apparatus 200 in the second embodiment.

FIG. 9 is a block diagram of the control apparatus 200. The control apparatus 200 includes a receiver 201 in addition to the control apparatus 100 described in the first embodiment. The components other than the receiver 201 are the same as the components of the control apparatus 100, and thus are denoted by the same reference numbers and description thereof may be omitted.

The receiver 201 includes one or more antennas and receives at least one of a signal including physical quantity information a (hereinafter also referred to as a physical quantity signal a) and a signal including physical quantity information b (hereinafter also referred to as a physical quantity signal b). At least one of the received physical quantity signals a and b is sent to the control plan generator 111.

The control plan generator 111 generates the control plan representing the operation during a predetermined duration of at least a part of the control target apparatus 250*a* further based on at least one of the physical quantity signal a and the physical quantity signal b transmitted from the receiver 201.

More specifically, the control plan generator 111 estimates or confirms the operation of the control target apparatus 250*a* (250*b*) based on the physical quantity information a (b) included in the physical quantity signal a (b). The control plan generator 111 generates the control plan of the control target apparatus 250*a* further based on the operation of the control target apparatus 250*a* and the operation of the control target apparatus 250*b*.

The configuration of the control apparatus 200 has been described above. Although the transmitter 102 and the receiver 201 include one or more antennas, the antennas may be shared by the transmitter 102 and the receiver 201, may be separately provided, or some of the antennas may be shared.

Figure 10:
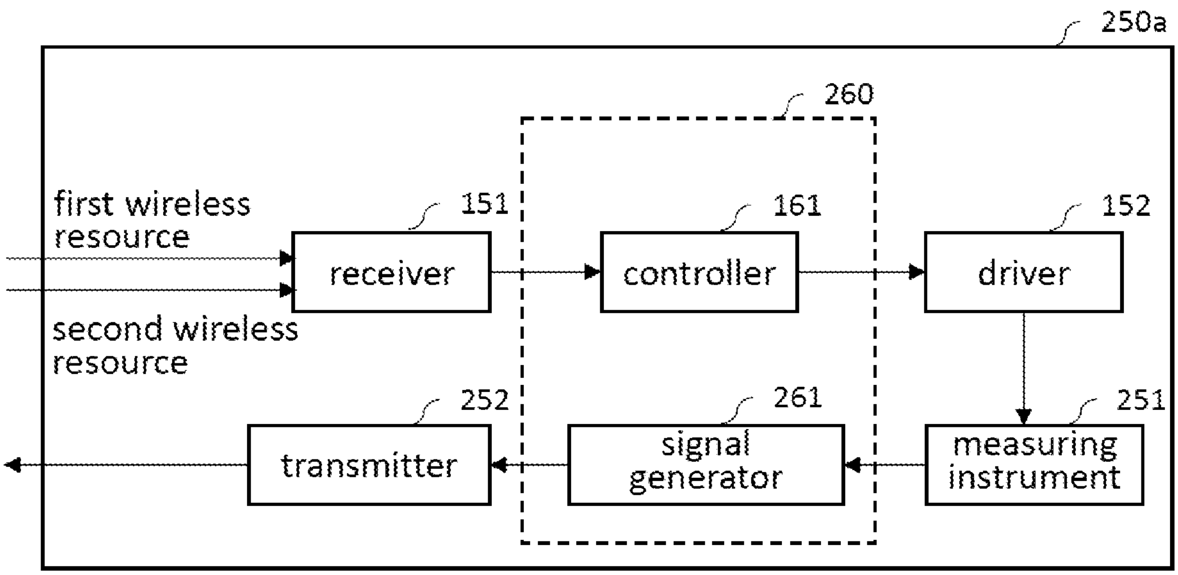
FIG. 10 is a block diagram of a control target apparatus **250*a*** in the second embodiment.

FIG. 10 is a block diagram of control target apparatus 250*a*. The control target apparatus 250*a* includes a measuring instrument 251, a signal generator 261, and a transmitter 252 in addition to the control target apparatus 150 described in the first embodiment. The components other than these are the same as the components of the control target apparatus 150, and thus are denoted by the same reference numbers and description thereof may be omitted. The signal generator 261 is included in the processor 260 together with the controller 161. The processor 260 is similar to the processor 160 described in the first embodiment.

The control target apparatus 250*a* is a device that receives at least one of the control signal and the partial control signal from the control apparatus 200 and changes at least a part of the position based on at least one of the control plan and the partial control plan. The control target apparatus 250*a* measures the physical quantity of the control target apparatus 250*a* in accordance with the operation of at least a part of the control target apparatus 250*a*. The control target apparatus 250*a* generates the physical quantity signal including the measured physical quantity as physical quantity information and transmits the physical quantity signal to the control apparatus 200. The control target apparatus 250*a* measures its own physical quantity in parallel with an operation similar to the operation of the control target apparatus 150 described in the first embodiment, and transmits the physical quantity as the physical quantity signal to the control apparatus 200 at predetermined time intervals.

The measuring instrument 251 measures the physical quantity of the control target apparatus 250*a*. The measuring instrument 251 sends information indicating the measured physical quantity to the signal generator 261. Any device can be applied as the measuring instrument 251 as long as it can measure the physical quantity of the control target apparatus 250*a*, and examples thereof include an encoder that measures a position in rotation, a global navigation satellite system (GNSS) that acquires a two-dimensional or three-dimensional position of the control target apparatus 250*a*, and a speedometer that measures a speed.

The signal generator 261 generates the physical quantity signal including the information indicating the physical quantity sent from the measuring instrument 251. The signal generator 261 sends the measurement signal to the transmitter 252. The transmitter 252 includes one or more antennas and transmits the physical quantity signal sent from the signal generator 261 to the control apparatus 200.

The configuration of the control target apparatus 250*a* has been described above. Although the transmitter 252 and the receiver 151 include one or more antennas, the antennas may be shared by the transmitter 252 and the receiver 151, may be separately provided, or some of the antennas may be shared. The control target apparatus 250*b* has the same components as those of the control target apparatus 250*a*, the description thereof will be omitted.

The control apparatus 200 and the control target apparatuses 250*a* and 250*b* according to the present embodiment have been described above. Various modifications can be implemented and executed. For example, the modification of the first embodiment can also be applied to the control apparatus 200 and the control target apparatuses 250*a* and 250*b* of the present embodiment. Hereinafter, modifications applicable to the present embodiment will be described.

(Tenth Modification)

In the present embodiment, the control target apparatuses 250*a* and 250*b* are similar apparatuses, but may be different apparatuses. For example, the control target apparatus 150 not to transmit the quantity signal and the control target apparatus 250*b* of the present embodiment may be used.

In this case, the control plan generator 111 generates the control plan of the control target apparatus 150 further based on the physical quantity of the control target apparatus 250*b*. The control plan generator 111 can generate the control plan of the control target apparatus 150 in consideration of the operation of at least a part of the control target apparatus 250*b*.

In addition, in the present embodiment, the case where the number of control target apparatuses 250 is two has been described, but the number may be one or three or more. Even in these cases, the control plan generator 111 can acquire the physical quantity information of the plurality of control target apparatuses 250 and generate the control plan of the control target apparatuses 250 in consideration of the variation of the control risk due to the physical quantity information.

(Modification 11)

In the first embodiment, the control apparatus 100 transmits the plans A to F in chronological order, but in a process of transmitting a plurality of plans, the determination of at least some of the plans and the partial control plan may be modified. For example, after transmission of the plan A, the receiver 201 receives the physical quantity signal of at least one of the control target apparatuses 250*a* and 250*b*, and the control plan generator 111 estimates or confirms the operation of at least one of the control target apparatuses 250*a* and 250*b*. The control plan generator 111 may modify at least one plan among the plans B to F already generated based on the operation of at least one of the control target apparatus 250*a* and the 250*b* estimated or confirmed. For example, the control plan generator 111 modifies the remaining control plans B to F to plans B' to F'.

In addition, the determiner 112 may receive information indicating the operation of at least one of the control target apparatus 250*a* and the 250*b* from the control plan generator 111, and may modify the already determined partial control plan. For example, the determiner 112 may modify the plans B' to E' among the plans B' to F' modified by the control plan generator 111 as the partial control plan. The control apparatus 200 includes the corrected control plan in the control signal and the partial control plan in the partial control signal, and transmit the signals.

In this way, the already generated plan and the already determined partial control plan can also be modified according to the operation of at least a part of the control target apparatus 250*a* and the control target apparatus 250*b*.

The modification of the present embodiment has been described above. These modifications may be used in combination. The control apparatus 200 of the present embodiment acquires the physical quantity information of at least one of the control target apparatus 250*a* and the control target apparatus 250*b*, and generates the control plan of the control target apparatus 250*a* further based on the physical quantity information. In this way, the control apparatus 200 can generate the control plan of the control target apparatus 250*a* according to the operation of at least a part of the control target apparatus 250*a* and 250*b*.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:

a processor configured to:

generate a control plan indicating an operation of at least a part of a control target apparatus during a predetermined duration;

determine a first control plan associated with a portion of the control plan;

generate a first control signal including the control plan and a second control signal including the first control plan; and command to transmit the first control signal by using a first wireless resource, and to transmit the second control signal by using a second wireless resource different from the first wireless resource.

2. The electronic apparatus according to claim 1, wherein the processor determines the first control plan based on information indicating an influence related to the operation of the at least the part of the control target apparatus.

3. The electronic apparatus according to claim 2, wherein:

the control plan includes a change in a position of the at least the part of the control target, and the processor determines the first control plan by using information indicating an influence on the control target apparatus or an influence on a surrounding of the control target apparatus when the change in the position of the at least the part of the control target apparatus is not controlled, as the information indicating the influence related to the operation of the at least the part of the control target apparatus.

4. The electronic apparatus according to claim 2, wherein the information indicating the influence related to the operation of the at least the part of the control target apparatus comprises at least one of:

first information indicating an influence on the control target apparatus when a change in a position of the at least the part of the control target apparatus is not controlled; and second information indicating a possibility that wireless transmission to the control target apparatus is not normally performed.

5. The electronic apparatus according to claim 2, wherein the processor determines the first control plan when a magnitude of the influence related to the operation of the at least the part of the control target apparatus is larger than a first value.

6. The electronic apparatus according to claim 2, wherein the processor determines, as the first control plan, a portion of the control plan in a period when a magnitude of the influence related to the operation of the at least the part of the control target apparatus is larger than a threshold value.

7. The electronic apparatus according to claim 1, wherein the second wireless resource is different from the first wireless resource in at least one of time, frequency, space, and code.

8. The electronic apparatus according to claim 1, wherein the processor determines, as the first control plan, a portion of the control plan in a part of the predetermined period.

9. The electronic apparatus according to claim 1, wherein:

the control plan is a plan indicating operations at a plurality of parts of the control target apparatus, and the processor determines a plan indicating an operation of a part of the plurality parts of the control target apparatus as the first control plan.

10. The electronic apparatus according to claim 1, wherein the second control signal includes identification information indicating that the second control signal corresponds to the first control signal.

11. The electronic apparatus according to claim 1, wherein the second control signal is generated by copying the first control signal.

12. The electronic apparatus according to claim 1, wherein the second control signal has a data size smaller than a data size of the first control signal.

13. The electronic apparatus according to claim 1, wherein the first wireless resource and the second wireless resource are network slices logically configured in one predetermined wireless communication standard.

14. The electronic apparatus according to claim 1, further comprising a transmitter to transmit the first control signal by using the first wireless resource and to transmit the second control signal by using the second wireless resource.

15. The electronic apparatus according to claim 1, further comprising a receiver to receive a signal including information indicating a physical quantity of at least one of the control target apparatus and an apparatus different from the control target apparatus, wherein the processor generates the control plan further based on the information indicating the physical quantity.

16. An electronic system comprising:

the electronic apparatus according to claim 1; and the control target apparatus.

17. A method comprising:

generating a control plan indicating an operation of at least a part of a control target apparatus during a predetermined duration;

determining a first control plan associated with a portion of the control plan;

generating a first control signal including the control plan and a second control signal including the first control plan; and commanding to transmit the first control signal by using a first wireless resource, and to transmit the second control signal by using a second wireless resource different from the first wireless resource.

18. The method according to claim 17, wherein the information indicating the influence related to the operation of the at least the part of the control target apparatus comprises at least one of:

first information indicating an influence on the control target apparatus when a change in a position of the at least the part of the control target apparatus is not controlled; and second information indicating a possibility that wireless transmission to the control target apparatus is not normally performed.

19. The method according to claim 17, wherein the determining comprises determining the first control plan when a magnitude of the influence related to the operation of the at least the part of the control target apparatus is larger than a first value.

20. The method according to claim 17, wherein the determining comprises determining, as the first control plan, a portion of the control plan in a period when a magnitude of the influence related to the operation of the at least the part of the control target apparatus is larger than a threshold value.

21. A non-transitory recording medium in which a program is stored, the program being executable to control a processor to execute a processes comprising:

generating a control plan indicating an operation of at least a part of a control target apparatus during a predetermined duration;

determining a first control plan associated with a portion of the control plan;

generating a first control signal including the control plan and a second control signal including the first control plan; and commanding to transmit the first control signal by using a first wireless resource, and to transmit the second control signal by using a second wireless resource different from the first wireless resource.

22. The non-transitory recording medium according to claim 21, wherein the information indicating the influence related to the operation of the at least the part of the control target apparatus comprises at least one of:

first information indicating an influence on the control target apparatus when a change in a position of the at least the part of the control target apparatus is not controlled; and second information indicating a possibility that wireless transmission to the control target apparatus is not normally performed.

23. The non-transitory recording medium according to claim 21, wherein the determining comprises determining the first control plan when a magnitude of the influence related to the operation of the at least the part of the control target apparatus is larger than a first value.

24. The non-transitory recording medium according to claim 21, wherein the determining comprises determining, as the first control plan, a portion of the control plan in a period when a magnitude of the influence related to the operation of the at least the part of the control target apparatus is larger than a threshold value.

* * * * *